United States Patent [19]

Szuhaj et al.

[11] 4,127,419

[45] Nov. 28, 1978

[54] PAN RELEASE AGENT

[75] Inventors: Bernard F. Szuhaj, Lombard; Joseph R. Yaste, Hoffmann Estates, both of Ill.

[73] Assignee: Central Soya Company, Inc., Fort Wayne, Ind.

[21] Appl. No.: 758,715

[22] Filed: Jan. 12, 1977

[51] Int. Cl.$^2$ ............................................. C08L 91/00
[52] U.S. Cl. .................................. 106/243; 106/244; 426/608; 426/811
[58] Field of Search ................ 106/243, 244; 426/609, 426/811, 602; 428/467; 260/403

[56] References Cited

U.S. PATENT DOCUMENTS

| | | | |
|---|---|---|---|
| 2,402,690 | 6/1946 | Stanley | 260/403 |
| 3,896,975 | 7/1975 | Follmer | 106/244 |
| 3,906,117 | 9/1975 | Gawrilow | 426/811 |

OTHER PUBLICATIONS

"Chemistry of Organic Compounds", Carl R. Noller, 1965, p. 209.

*Primary Examiner*—Theodore Morris
*Attorney, Agent, or Firm*—Tilton, Fallon, Lungmus & Chestnut

[57] ABSTRACT

A pan release agent employing a lecithin, an alcohol, at least one tri-glycol ester and water.

4 Claims, No Drawings

PAN RELEASE AGENT

BACKGROUND AND SUMMARY OF INVENTION

This invention relates to a pan release agent and more particularly to a pan release agent employing lecithin that can be dispensed without the need of an aerosol propellant.

In the past, lecithin has been commercially marketed as a pan release agent and packaged in aerosol containers wherein much of the total product is the propellant/solvent system which evaporates to the atmosphere upon use. Flurocarbons have been the propellant/solvents primarily employed. Considering the possible harmful effects of fluorocarbons on the ozone layer, there is a trend away from their usage. Even the other aerosol propellant/solvent such as low molecular weight hydrocarbons with carbon dioxide or nitrous oxide has been considered undesirable because of the possible danger from fire or explosion.

One attempt to avoid all these difficulties has been the development of a water based modified lecithin mechanically dispensable pan release agent as found in U.S. Pat. No. 3,928,056. This has proved satisfactory for some food usages but is characterized by a somewhat "soapy" flavor resulting from the modified lecithin and therefore does not provide optimum characteristics.

It would therefore be desirable to provide a pan release agent which would be mechanically dispensed (and therefore eliminate all the problems of the previously employed aerosols) yet one which would be optimal in organoleptic properties as well as being stable. By stability, we refer not only to the resistance of the agent to separate into layers but also its ability to avoid smoke generation when applied to a heated surface.

Besides the problems of taste and stability, another problem exists with utilizing lecithin in an aerosol-free dispenser — the need for a solvent because of the high viscosity of the lecithin, even when oil based. Even an alcohol solvent (notably ethanol when a food usage is indicated) cannot provide proper solubility for either lecithin or a lecithin-vegetable oil mixture — in particular, the class of vegetable oils known as oleic-linoleic acid oils or triglycerides composed of the triglycerides of predominately 16 to 18 carbon atoms of fatty acids also are not soluble in alcohol. Such vegetable oils of this classification usually include those of the soybean, peanut, cottonseed, safflower and sunflower and which can be used to dilute commercial lecithin. Although lecithin derived from soybeans is preferred, other vegetable sources may be utilized.

We have discovered that the lecithin-vegetable oil and alcohol can be brought into a stable solution system when these ingredients are augmented by other oils or modifications thereof which are generally classified as lauric acid oils where the fatty acids are predominately of the 6 to 12 carbon atom variety. Examples of such oils that exhibit partial or total solubility in alcohol are coconut, cohune, murumru tallow, palm kernel, tucum, ucuhuba tallow as either the glycerol esters or propylene glycol esters of the short chain fatty acids primarily in the range of $C_6$ to $C_{12}$. Also included are fractionated portions of these oils which result in higher $C_6$ to $C_{12}$ fatty acid concentrations and esterified triglycerides and propylene glycol wherein the replacement fatty acids are in the $C_6$ to $C_{12}$ range. These compounds can be used as the mutual solvent to dissolve lecithin, vegetable oils of the oleic acid class, and ethyl alcohol.

As a generic reference for the above identified materials we employ the term tri-glycol ester wherein the fatty acid chains have from 6 to 12 carbon atoms. Also, to refer to the vegetable oil ingredient, we use the same term but designate that the fatty acid chain has from 16 to 18 carbon atoms. For convenience we refer to the lower carbon chain tri-glycol as "lauric" and the higher "oleic."

With the combination of lecithin, alcohol and the two types of tri-glycol esters, we are able to improve taste, avoid separation, optimize viscosity and cost and to elevate the smoke point and this invention has been the subject of our co-pending application Ser. No. 758,716, filed Jan. 21, 1977.

However, the invention in the just identified application is not uniformly useful in a water-based system. Inasmuch as a water based system is highly desirable from the cost standpoint — the heated pan surface rapidly evaporating the water carrier — it would be advantageous to provide a water based release agent. This is provided by the instant invention utilizing the discovery set forth in the above identified application and further elucidates the parameters for an especially useful water-based system.

Other objects and advantages of the invention may be seen in the details set forth in the ensuing specification.

DETAILED DESCRIPTION

As an example of one preferred form of the invention, the following example is set down.

EXAMPLE I

As an especially suitable pan release agent, we made a mixture of 5 grams of oil-free lecithin with 2.5 grams of a fractionated, re-esterified triglyceride of coconut oil and 2.5 grams soybean oil by heating to about 160° F. with stirring. The lecithin of this example is commercially available from Central Soya Company, Inc. under the designation centrolex. The triglyceride, i.e., the tri-glycol ester having the short carbon chains, is commercially available under the designation NEOBEE M5 from Pacific Vegetable Oil Corporation. Although lower temperatures may be used for mixing, proportionately longer times are required.

Thereafter the mixture is cooled to about 90° F. at which time 25 grams of ethyl alcohol and 65 grams of water were added and mixed well to provide physically stable solution. This was readily sprayable with a mechanical hand pump to a fine mist. No trace of smoke was available when sprayed upon a heated surface until the temperature of the surface reached 340° F. A smoke point of this order is generally acceptable because when food is present, heat is taken up by the food so that the surface temperature of the pan does not reach this value. Further, no separation was noted when the solution was left standing overnight.

The optimum formulation thus contains:

| | |
|---|---|
| Lecithin | 5% |
| Shortchain esters | 2½% |
| Longchain esters | 2½% |
| Ethanol | 25% |
| Water | 65% |

This was derived from a series of tests wherein the proportions of ingredients were varied and the stability noted. In the Example below, higher values of lecithin were employed.

EXAMPLE II

Here the procedure of Example I was followed, adjusting the lecithin concentration to 10% but varying the proportions of the other ingredients with the results being tabulated immediately below.

| % lauric | % oleic | % EtOH | % Water | Separation |
|---|---|---|---|---|
| 5 | — | 25 | 60 | Yes |
| 10 | — | 25 | 55 | Yes |

From the foregoing tabulation of results, it will be seen that the higher level of lecithin does not provide a stable release agent, even when the longer chain tri-glycol ester is omitted. From the work done in connection with the invention of the above-identified application it was noted that the shorter chain tri-glycol esters were most beneficial in establishing a soluble system. Thus, even when these were maximized there was not the requisite stability with the higher lecithin level.

It is advantageous to utilize the longer chain esters because these add a desirable lubricity to the product besides being cheaper and elevating the smoke point. Thus, a series of test was undertaken with the lecithin at a 5% level but varying the proportions of the remaining ingredients.

EXAMPLE III

The procedure of Example I was followed but the ingredient proportions varied and with the results as tabulated below:

| % lauric | % oleic | % EtOH | % Water | Separation |
|---|---|---|---|---|
| 10 | 0 | 25 | 60 | No |
| 7.5 | 2.5 | 25 | 60 | No |
| 5 | 5 | 25 | 60 | No |
| 5 | 2.5 | 25 | 62.5 | No |
| 5 | 0 | 25 | 60 | No |
| 2.5 | 7.5 | 25 | 60 | Yes |
| 2.5 | 5 | 25 | 62.5 | Yes |

It is economically desirable to maximize both the water and the longer chain esters, maintaining the ethanol at a level of 20–25% to inhibit bacterial and mold development.

Thus, the optimum ranges for the water-based pan release agent are as follows:

| Lecithin | about 5% |
|---|---|
| Shortchain esters | 2.5–10% |
| Long chain esters | up to 5% |
| ethanol | 20–25% |
| Water | 60–65% |

It is important that the lecithin be first mixed with the tri-glycol/glycols — the lecithin not mixing with ethanol or water to provide the physically stable solution. For the subsequent ethanol-water addition the temperature is reduced to avoid flashing the ethanol.

While in the foregoing specification a detailed description of the invention has been set down for the purpose of explanation, many variations in the details hereingiven may be made by those skilled in the art without departing from the spirit and scope of the invention.

We claim:

1. A method of preparing a sprayable pan release product comprising mixing lecithin and a tri-glycol ester having fatty acid chains from 6 to 12 carbon atoms at a temperature sufficient to form a solution thereof, cooling the mixture to about 90° F., adding thereto an alcohol and water, said alcohol being present in an amount of about 20% to about 25% of the weight of said product, said water being present in an amount from about 60% to about 65%, said lecithin being present in an amount of about 5% with the remainder being a member selected from the class consisting of said tri-glycol ester and a mixture of said tri-glycol ester and a second tri-glycol ester having fatty chains of from 16 to 18 carbon atoms, and placing the mixture in a mechanical dispensing container whereby dispensing is achieved without the use of an aerosol propellant.

2. The method of claim 1 in which said lecithin is derived from soybeans and contains less than 3% soybean oil.

3. The method of claim 1 in which said lecithin contains about 40% soybean oil.

4. The method of claim 3 in which a second tri-glycol ester having fatty acids chains of from 16 to 18 carbon atoms is added subsequent to the addition of the first mentioned tri-glycol ester.